(12) United States Patent
Yoshida et al.

(10) Patent No.: US 12,388,069 B2
(45) Date of Patent: Aug. 12, 2025

(54) METHOD OF PRODUCING ELECTRODE, METHOD OF PRODUCING BATTERY, ELECTRODE, AND BATTERY

(71) Applicant: PRIME PLANET ENERGY & SOLUTIONS, INC., Tokyo (JP)

(72) Inventors: Hikaru Yoshida, Ibaraki (JP); Shigeki Matsuta, Kobe (JP)

(73) Assignee: PRIME PLANET ENERGY & SOLUTIONS, INC., Tokyo (JP)

(*) Notice: Subject to any disclaimer, the term of this patent is extended or adjusted under 35 U.S.C. 154(b) by 560 days.

(21) Appl. No.: 17/482,580

(22) Filed: Sep. 23, 2021

(65) Prior Publication Data

US 2022/0131123 A1    Apr. 28, 2022

(30) Foreign Application Priority Data

Oct. 26, 2020    (JP) .................. 2020-178750

(51) Int. Cl.
*H01M 4/04* (2006.01)
*H01M 4/02* (2006.01)
*H01M 4/62* (2006.01)

(52) U.S. Cl.
CPC ......... *H01M 4/0416* (2013.01); *H01M 4/043* (2013.01); *H01M 4/0471* (2013.01); *H01M 4/622* (2013.01); *H01M 2004/021* (2013.01)

(58) Field of Classification Search
CPC .. H01M 4/0416; H01M 4/043; H01M 4/0471; H01M 4/622; H01M 2004/021
See application file for complete search history.

(56) References Cited

U.S. PATENT DOCUMENTS 8,877,373 B2 * 11/2014 Lee .................. H01M 10/0525
429/207
2002/0150821 A1    10/2002 Fukuda et al.
(Continued)

FOREIGN PATENT DOCUMENTS

| CN | 102256695 A | 11/2011 |
| CN | 111758173 A | 10/2020 |

(Continued)

OTHER PUBLICATIONS

EPO English Machine Translation of JP 2005213379, originally published to Tanimura Toshihiro on Aug. 11, 2005 (Year: 2005).*

(Continued)

*Primary Examiner* — Niki Bakhtiari
*Assistant Examiner* — James A Corno
(74) *Attorney, Agent, or Firm* — Finnegan, Henderson, Farabow, Garrett and Dunner LLP

(57) ABSTRACT

A slurry is prepared by mixing active material particles, capsule-shaped particles, a binder, and an organic solvent. The slurry is applied to a surface of a substrate to form a coating film. The coating film is heated to dry to form an active material layer. The active material layer is compressed to produce an electrode. Each of the capsule-shaped particles includes a thermoplastic resin. The thermoplastic resin softens when heated in the presence of the organic solvent. When the thermoplastic resin softens, the capsule-shaped particles shrink to form voids in the active material layer.

18 Claims, 12 Drawing Sheets

(56) References Cited

U.S. PATENT DOCUMENTS

| | | | |
|---|---|---|---|
| 2008/0292965 A1* | 11/2008 | Kubota | H01M 4/623 |
| | | | 429/246 |
| 2013/0260240 A1* | 10/2013 | Lee | H01M 4/0419 |
| | | | 521/50 |
| 2014/0308582 A1* | 10/2014 | Satow | H01M 4/133 |
| | | | 429/217 |
| 2016/0310924 A1 | 10/2016 | Nakatomi et al. | |
| 2017/0173893 A1 | 6/2017 | Li et al. | |
| 2020/0403276 A1 | 12/2020 | Yamamoto et al. | |

FOREIGN PATENT DOCUMENTS

| | | |
|---|---|---|
| JP | S 59-196564 A | 11/1984 |
| JP | S 63-124368 A | 5/1988 |
| JP | H 11-329450 A | 11/1999 |
| JP | 2001-332245 A | 11/2001 |
| JP | 2002-146087 A | 5/2002 |
| JP | 2005213379 A * | 8/2005 |
| JP | 2006-210089 A | 8/2006 |
| JP | 2008-004302 A | 1/2008 |
| JP | 2008-010253 A | 1/2008 |
| JP | 2011204571 A * | 10/2011 |
| JP | 2014-194864 A | 10/2014 |
| JP | 2015-170508 A | 9/2015 |
| JP | 2016025007 A * | 2/2016 |
| JP | 2016-058343 A | 4/2016 |
| KR | 10-2020-0108466 A | 9/2020 |
| WO | WO 2015/098586 A1 | 7/2015 |
| WO | WO 2016-208480 A1 | 12/2016 |
| WO | WO 2019-189865 A1 | 10/2019 |
| WO | WO 2020/117060 A2 | 6/2020 |

OTHER PUBLICATIONS

EPO English Machine Translation of JP 2011204571 originally published to Nagura Kensuke on Oct. 13, 2011 (Year: 2011).*

* cited by examiner

METHOD OF PRODUCING ELECTRODE, METHOD OF PRODUCING BATTERY, ELECTRODE, AND BATTERY

This nonprovisional application is based on Japanese Patent Application No. 2020-178750 filed on Oct. 26, 2020, with the Japan Patent Office, the entire contents of which are hereby incorporated by reference.

BACKGROUND OF THE INVENTION

Field of the Invention

The present disclosure relates to a method of producing an electrode, a method of producing a battery, an electrode, and a battery.

Description of the Background Art

International Patent Laying-Open No. WO 2015/098586 (Document 1) discloses adding hollow particles to a negative electrode slurry (see paragraphs 0124 to 0127, for example).

SUMMARY OF THE INVENTION

There is a demand for decreasing battery resistance. Battery resistance may be decreased by, for example, increasing the reaction area in the electrode.

An electrode includes an active material layer. The active material layer includes active material particles. Generally, the active material layer is porous. There are gaps (voids) between the active material particles, and an electrolyte solution permeates into these voids. At the interface between the active material particles and the electrolyte solution, electrode reaction occurs and proceeds. For example, the amount and the shape of the voids within the active material layer can be controlled to increase the reaction area and thereby decrease the battery resistance.

For example, it is expected that when the density of the active material layer is decreased, the amount of voids increases. It is expected that when the amount of voids increases, the reaction area increases. However, when the density of the active material layer is simply decreased, the number of points of contact between the active material particles can also decrease, leading to an increase in the resistance to electronic conduction. The increased resistance to electronic conduction can lead to an increase in battery resistance.

Adding a blowing agent (a gas-generating substance) to the active material layer can also be considered, for example. It is expected that the blowing agent generates gas within the active material layer to form voids within the active material layer. However, it can be difficult to control the shape of the voids by gas generation. In addition, in general, the active material layer is compressed with a rolling mill during electrode production, and the voids can be crushed while the active material layer is being compressed.

Compressing the active material layer with embossing rollers and/or the like to form grooves on the surface of the active material layer can be considered, for example. The grooves thus formed apparently increase the surface area of the active material layer. However, in a portion where these grooves are formed, the density of the active material layer is higher than in the other portions. When the amount of voids in the active material layer decreases, battery resistance can increase. When the density of the active material layer is not uniform, the electrode reaction can be non-uniform, potentially causing some other inconvenience.

An object of the present disclosure is to decrease battery resistance.

Hereinafter, the technical configuration and effects of the present disclosure will be described. It should be noted that the action mechanism according to the present disclosure includes presumption. The scope of claims should not be limited by whether or not the action mechanism is correct.

[1] A method of producing an electrode includes (A1) to (D1) below:
  (A1) preparing a slurry by mixing active material particles, capsule-shaped particles, a binder, and an organic solvent;
  (B1) applying the slurry to a surface of a substrate to form a coating film;
  (C1) drying the coating film by heating to form an active material layer; and
  (D1) compressing the active material layer to produce an electrode.

Each of the capsule-shaped particles includes a thermoplastic resin. The thermoplastic resin softens when heated in the presence of the organic solvent. When the thermoplastic resin softens, the capsule-shaped particles shrink to form voids in the active material layer.

In the method of producing an electrode according to [1] above, capsule-shaped particles are used to form voids. In a sense, the capsule-shaped particles are a void-forming aid. The slurry is a precursor for the active material layer. The capsule-shaped particles are added to the slurry. The slurry includes an organic solvent. When heated while in contact with an organic solvent, the capsule-shaped particles soften and shrink.

While the slurry is dried, the capsule-shaped particles are heated in the presence of the organic solvent. By this, the capsule-shaped particles shrink to form voids in the active material layer. According to the present disclosure, the number and shape of the capsule-shaped particles may be changed to control the amount of the voids and the shape of the voids. As a result, battery resistance may be decreased.

According to the present disclosure, the presence of the organic solvent can lower a softening point of the thermoplastic resin. As a result, the capsule-shaped particles can be made to shrink at a temperature within a certain range at which the other materials (such as the binder, for example) do not receive excessive heat damage.

Document 1 neither discloses nor suggests making hollow particles shrink in an active material layer to form voids. Document 1 discloses calcining a formed body that includes hollow particles to form independent air bubbles (see paragraph 0059). It should be noted that this method cannot be applied to an electrode. It is because the calcination may degrade the binder and thereby the binder may lose its binding force. When the binding force of the binder is lost, the structure of the active material layer may not be maintained. There is also a possibility that the calcination may burn the binder away.

[2] In the production method according to [1] above, each of the capsule-shaped particles may include an outer shell and an enclosed content, for example. The outer shell includes a thermoplastic resin. The enclosed content includes at least one selected from the group consisting of a volatile substance and a gas.

The capsule-shaped particles may be so-called thermally expandable microcapsules, for example. Each of the thermally expandable microcapsules includes a volatile substance as an enclosed content. When an outer shell of the thermally expandable microcapsule softens and breaks, the enclosed content may be released and the thermally expandable microcapsule may shrink. The thermally expandable microcapsules before expanded may be used as the capsule-shaped particles according to the present disclosure. The thermally expandable microcapsule before expanded includes a volatile substance (either solid or liquid) as an enclosed content. The thermally expandable microcapsules after expanded may be used as the capsule-shaped particles according to the present disclosure. The thermally expandable microcapsule after expanded includes a gas as an enclosed content.

[3] In the production method according to [2] above, when the enclosed content includes a volatile substance, the volatile substance may have a volume fraction of, for example, 5% or more relative to the capsule-shaped particles.

[4] In the production method according to [2] above, when the enclosed content includes a gas, the gas may have a volume fraction of, for example, 50% or more relative to the capsule-shaped particles.

[5] In the production method according to [1] to [4] above, a ratio of a D50 of the capsule-shaped particles to a thickness of the active material layer may be from 0.2 to 0.8, for example.

When the ratio of a D50 of the capsule-shaped particles to a thickness of the active material layer is from 0.2 to 0.8, application properties of the slurry tend to be enhanced.

[6] In the production method according to [1] to [5] above, each of the active material particles includes a positive electrode active material or a negative electrode active material.

In other words, in the production method according to the present disclosure, either a positive electrode or a negative electrode may be produced. Therefore, the substrate according to the present disclosure is either a positive electrode substrate or a negative electrode substrate. The active material layer according to the present disclosure is either a positive electrode active material layer or a negative electrode active material layer.

[7] A method of producing a battery includes (A2) to (F2):
(A2) preparing a slurry by mixing active material particles, capsule-shaped particles, a binder, and an aqueous solvent;
(B2) applying the slurry to a surface of a substrate to form a coating film;
(C2) drying the coating film by heating to form an active material layer;
(D2) compressing the active material layer to produce an electrode;
(E2) assembling a battery that includes the electrode and an electrolyte solution; and
(F2) performing thermal aging of the battery.

The electrolyte solution includes an organic solvent. Each of the capsule-shaped particles includes a thermoplastic resin. The thermoplastic resin softens upon contact with the electrolyte solution. When the thermoplastic resin softens, the capsule-shaped particles shrink to form voids in the active material layer.

In the method of producing a battery according to [7] above, voids are formed after the electrode is produced and before the battery is completed. In the production method according to [7] above, an aqueous solvent is used as a dispersion medium for the slurry. The thermoplastic resin contained in the capsule-shaped particles tends not to shrink when heated in the aqueous solvent. Therefore, in the production method according to [7] above, in the electrode after drying, the capsule-shaped particles may remain without substantially shrinking. Further, the capsule-shaped particles may maintain the predetermined shape thereof in the electrode after compression.

In the production method according to [7] above, in the battery, the capsule-shaped particles come into contact with the electrolyte solution. In other words, the capsule-shaped particles come into contact with the organic solvent. Upon contact with the organic solvent, the capsule-shaped particles may shrink. In other words, voids may be formed.

[8] In the production method according to [7] above, voids may be formed at the time of the thermal aging, for example.

In the production method according to [7] above, the capsule-shaped particles may shrink during the time between coming into contact with the electrolyte solution and the thermal aging, for example. The capsule-shaped particles may shrink as a result of coming into contact with the organic solvent and being heated. That is, voids may be formed before the thermal aging, or voids may be formed at the time of the thermal aging. The timing of void formation (the timing of the capsule-shaped particles to shrink) may be controlled by changing the type of the thermoplastic resin, for example.

[9] In the production method according to [7] or [8] above, each of the capsule-shaped particles may include an outer shell and an enclosed content, for example. The outer shell includes a thermoplastic resin. The enclosed content includes at least one selected from the group consisting of a volatile substance and a gas.

[10] In the production method according to [9] above, when the enclosed content includes a volatile substance, the volatile substance may have a volume fraction of, for example, 5% or more relative to the capsule-shaped particles.

[11] In the production method according to [9] above, when the enclosed content includes a gas, the gas may have a volume fraction of, for example, 50% or more relative to the capsule-shaped particles.

[12] In the production method according to [7] to [11] above, the ratio of a diameter of the capsule-shaped particle to a thickness of the active material layer may be from 0.2 to 0.8, for example.

[13] In the production method according to [7] to [12] above, each of the active material particles includes a positive electrode active material or a negative electrode active material.

[14] An electrode includes a substrate and an active material layer. The active material layer is placed on a surface of the substrate. The active material layer includes active material particles, a resin fragment, and a binder. In the active material layer, voids are formed. Each of the voids has a diameter larger than a particle size of the active material particles. The resin fragment is placed inside the voids. The resin fragment includes a thermoplastic resin.

Each of the voids in the electrode according to the present disclosure has a diameter larger than a particle size of the active material particles. In other words, the voids according to the present disclosure are different from simple gaps formed between the active material particles. Inside the voids according to the present disclosure, an electrolyte solution may be held. The voids according to the present disclosure contribute to increasing the reaction area. Therefore, in a battery that includes the electrode according to the present disclosure, battery resistance may be decreased.

The electrode according to the present disclosure may be formed by the production method according to [1] to [13] above, for example. The resin fragment in the electrode according to the present disclosure may be a shrunk capsule-shaped particle. Usually, the resin fragment may have a large electrical resistance. Therefore, usually, when a resin fragment is present in an active material layer, battery resistance is expected to be increased. On the other hand, the resin fragment according to the present disclosure is placed inside the voids. A resin fragment placed inside the voids is not likely to substantially inhibit electronic conduction and ionic conduction inside the active material layer.

[15] In the electrode according to [14] above, at least some of the voids may have openings in a surface of the active material layer. Each of the openings may have a width smaller than an internal width of the void.

When a void has an opening in a surface of the active material layer, enhanced charge properties (enhanced accepting ability) and the like may be obtained, for example. A void having an opening (mouth) that is narrower than the interior may be formed as a result of a part of a capsule-shaped particle exposed from a surface of the coating film. To form a void having a mouth narrower than the interior by embossing rollers or the like is considered to be difficult.

[16] The voids may have a number density from 50 voids/mm$^2$ to 10000 voids/mm$^2$, for example.

When the number density of the voids is from 50 voids/mm$^2$ to 10000 voids/mm$^2$, a good balance between battery resistance and capacity tends to be obtained.

[17] Each of the active material particles includes a positive electrode active material or a negative electrode active material.

[18] A battery includes the electrode according to [14] to [17] above and an electrolyte solution.

The battery according to the present disclosure is expected to have a low battery resistance. This occurs probably because of the large reaction area of the electrode.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Next, embodiments of the present disclosure (also called "the present embodiment" hereinafter) will be described. It should be noted that the below description does not limit the scope of claims.

Any geometric term in the present specification (such as "perpendicular", for example) should not be interpreted solely in its exact meaning. For example, "perpendicular" may mean a geometric state that is deviated, to some extent, from exact "perpendicular". Any geometric term in the present specification may include tolerances and/or errors in terms of design, operation, production, and/or the like.

The dimensional relationship in each figure may not necessarily coincide with the actual dimensional relationship. The dimensional relationship (in length, width, thickness, and the like) in each figure may have been changed for the purpose of assisting the understanding.

In the present specification, the expression "consist essentially of" means a concept between "consist of" and "comprise". The expression "consist essentially of" means that an additional component may also be included in addition to an essential component or components, unless an object of the present disclosure is impaired. For example, a component that is usually expected to be included in the relevant technical field (such as impurities, for example) may be included as an additional component.

In the present specification, a numerical range such as "from 0.2 to 0.8" includes both the upper limit and the lower limit, unless otherwise specified. For example, "from 0.2 to 0.8" means a numerical range of "not less than 0.2 and not more than 0.8". Moreover, any numerical value selected from the numerical range may be used as a new upper limit and/or a new lower limit. For example, any numerical value within the numerical range and any numerical value described elsewhere in the present specification may be combined to create a new numerical range.

In the present specification, when a compound is represented by a stoichiometric composition formula such as "LiCoO$_2$", this stoichiometric composition formula is merely a typical example. For example, when lithium cobalt oxide is represented as "LiCoO$_2$", the composition ratio of lithium cobalt oxide is not limited to "Li/Co/O=1/1/2" but Li, Co, and O may be included in any composition ratio, unless otherwise specified. The composition ratio may be non-stoichiometric.

In the present specification, depending on the context, the terms "particle" and "void" may be used in singular, or may be used in plural, or may be used in both. For example, the term "particle" may be used in singular to mean an individual particle, or may be used in plural to mean a group of particles (powder).

The present disclosure may be applied to any type of battery. A lithium-ion battery is merely a part of the present embodiment.

<First Production Method (Method of Producing Electrode)>

Figure 1:
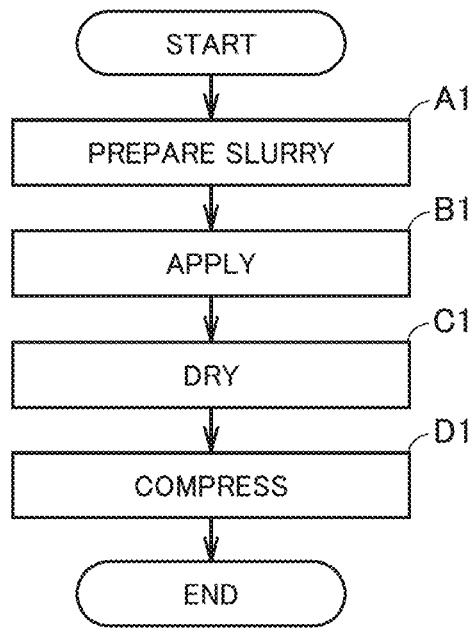
FIG. 1 is a schematic flowchart illustrating a first production method.

FIG. 1 is a schematic flowchart illustrating a first production method.

A first production method according to the present embodiment is a method of producing an electrode. The first production method includes "(A1) Preparing a slurry", "(B1) Applying", "(C1) Drying", and "(D1) Compressing".

<<(A1) Preparing Slurry>>

The first production method includes preparing a slurry by mixing active material particles, capsule-shaped particles, a binder, and an organic solvent. In the first production method, the organic solvent is used as a dispersion medium for the slurry.

In the present embodiment, any stirring apparatus, any mixing apparatus, and/or any dispersing apparatus may be used. For example, materials are added in a predetermined formulation to a stirring vessel of a stirring apparatus, and stirred. Thus, a slurry is prepared. In addition to the active material particles, the capsule-shaped particles, the binder, and the organic solvent, a conductive material and/or the like may also be mixed in the slurry, for example. The stirring conditions (stirring duration, stirring rate, and/or the like) are adjusted as appropriate. The order for adding the materials is not limited. All the materials may be added at once, or the materials may be added sequentially.

(Capsule-Shaped Particles)

The capsule-shaped particles function as a void-forming aid. The capsule-shaped particles shrink within an active material layer (or within a coating film) to form voids. The shape of the voids may be controlled by changing the shape of the capsule-shaped particles. The capsule-shaped particles may have a D50 from 1 μm to 100 μm, for example. The "D50" according to the present embodiment refers to a particle size in volume-based particle size distribution at which the cumulative particle volume (accumulated from the side of small particle sizes) reaches 50% of the total particle volume. The D50 may be measured by a laser diffraction and scattering method. The capsule-shaped particles may have a D50 from 5 μm to 40 μm, for example.

For example, the D50 of the capsule-shaped particles and the desired thickness of the active material layer may satisfy a certain relationship. For example, a ratio of the D50 of the capsule-shaped particles to the thickness of the active material layer may be from 0.2 to 0.8. When the ratio of the D50 of the capsule-shaped particles to the thickness of the active material layer is from 0.2 to 0.8, application properties of the slurry tend to be enhanced. The ratio of the D50 of the capsule-shaped particles to the thickness of the active material layer may be from 0.3 to 0.7, or may be from 0.4 to 0.6, for example.

During the process of electrode production, the capsule-shaped particles according to the present embodiment may expand before shrinking. The capsule-shaped particles, while they are in the expanded state, may have a D50 greater than that of the active material particles. In the configuration in which the capsule-shaped particles are larger in size than the active material particles, voids that are larger in size than the active material particles may be formed.

The capsule-shaped particles may have any particle shape. The capsule-shaped particles may be spherical, columnar, plate-like, and/or the like, for example.

By changing the amount of the capsule-shaped particles, the amount of the voids and the number density of the voids in the active material layer may be controlled, for example. The capsule-shaped particles may have a mass fraction from 0.01% to 5% relative to the other solid matter, for example. "The other solid matter" refers to the sum of the components contained in the slurry, except the dispersion medium and the capsule-shaped particles. The capsule-shaped particles may have a mass fraction from 0.05% to 3%, or may have a mass fraction from 0.1% to 1%, or may have a mass fraction from 0.2% to 0.8%, or may have a mass fraction from 0.3% to 0.7%, relative to the other solid matter, for example.

Each of the capsule-shaped particles includes a thermoplastic resin. In the present embodiment, a thermoplastic resin with particular characteristics is selected. More specifically, the thermoplastic resin may soften when heated in the presence of the organic solvent. The thermoplastic resin in the presence of the organic solvent may have a softening point from 60° C. to 160° C., for example. The thermoplastic resin in the presence of the organic solvent may have a softening point from 100° C. to 140° C., for example. The thermoplastic resin in the presence of the organic solvent may have a softening point from 60° C. to 100° C., for example.

For example, the thermoplastic resin may be a material that does not substantially soften only by contact with the organic solvent. For example, the thermoplastic resin may be a material that does not substantially dissolve in the organic solvent. For example, the thermoplastic resin may partially dissolve in the organic solvent.

The thermoplastic resin may be formed by polymerization of one or more types of monomers. The thermoplastic resin may include a constitutional repeating unit derived from, for example, at least one selected from the group consisting of nitrile-based monomers, carboxy-group-containing monomers, (meth)acrylic-acid-ester-based monomers, vinyl-based monomers, and vinylidene-based monomers. The nitrile-based monomers may include, for example, at least one selected from the group consisting of acrylonitrile and methacrylonitrile. The carboxy-group-containing monomers may include, for example, at least one selected from the group consisting of acrylic acid and methacrylic acid. The "(meth)acrylic" according to the present embodiment refers to acrylic or methacrylic. The (meth)acrylic-acid-ester-based monomers may include, for example, at least one selected from the group consisting of methyl (meth)acrylate, ethyl (meth)acrylate, and butyl (meth)acrylate. The vinyl-based monomers may include vinyl chloride and/or the like, for example. The vinylidene-based monomers may include vinylidene chloride and/or the like, for example.

The thermoplastic resin may include, for example, at least one selected from the group consisting of acrylic-based resins, acrylonitrile-based resins, and vinylidene-chloride-based resins.

Figure 2:
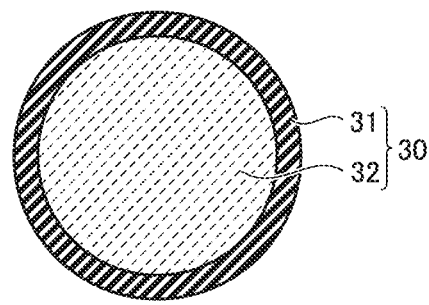
FIG. 2 is a conceptual view illustrating capsule-shaped particles according to the present embodiment.

FIG. 2 is a conceptual view illustrating capsule-shaped particles according to the present embodiment.

Each of capsule-shaped particles 30 includes an outer shell 31. Capsule-shaped particles 30 may be hollow, for example. Each of capsule-shaped particles 30 may include outer shell 31 and an enclosed content 32. For example, commercially available thermally expandable microcapsules may be used as capsule-shaped particles 30.

Outer shell 31 includes the above-described thermoplastic resin. Enclosed content 32 includes at least one selected from the group consisting of a volatile substance and a gas. When thermally expandable microcapsules before expanded are used as capsule-shaped particles 30, enclosed content 32 includes a volatile substance. The volatile substance is a substance that generates gas when heated. The volatile substance may include a liquid hydrocarbon and/or the like, for example. The volatile substance may include at least one selected from the group consisting of butane, pentane, hexane, heptane, and octane, for example. When enclosed content 32 includes a volatile substance, the volatile substance may have a volume fraction of, for example, not less than 5% and less than 100% relative to capsule-shaped particles 30. The volatile substance may have a volume fraction from 10% to 50%, or may have a volume fraction from 10% to 40%, relative to capsule-shaped particles 30, for example.

In the present embodiment, the volume fraction of enclosed content 32 is measured in a cross-sectional SEM (Scanning Electron Microscope) image of capsule-shaped particle 30. A plurality of capsule-shaped particles 30 are embedded in a predetermined resin. The resin is cut to prepare a cross-sectional sample. At this point, enclosed content 32 may be substantially removed. The surface of the cross-sectional sample is cleaned. An SEM is used to observe the cross sections of capsule-shaped particles 30. In the cross sections of capsule-shaped particles 30, the area of outer shell 31 (s1) and the area of a hollow portion formed by enclosed content 32 (s2) are measured. The volume fraction of enclosed content 32 is calculated by the following equation: Volume fraction (%)=s2/(s1+s2). As for ten or more capsule-shaped particles 30, the volume fraction of enclosed content 32 is measured. The arithmetic mean of these ten or more values of volume fraction is used as the volume fraction of enclosed content 32. In the present embodiment, the volume fraction of enclosed content 32 is significant to its integer places. It is rounded to the nearest integer.

When thermoplastic microcapsules after expanded are used as capsule-shaped particles 30, enclosed content 32 includes a gas. The gas may include hydrocarbon gas and/or the like, for example. When enclosed content 32 includes a gas, the gas may have a volume fraction of, for example, not less than 50% and less than 100% relative to capsule-shaped particles 30. The gas may have a volume fraction of not less than 70% and less than 100%, or may have a volume fraction of not less than 95% and less than 100%, or may have a volume fraction from 95% to 99%, relative to capsule-shaped particles 30, for example.

(Active Material Particles)

Each of the active material particles includes a positive electrode active material or a negative electrode active material. The size of the active material particles is not limited. The active material particles may have a D50 from 1 μm to 30 μm, or may have a D50 from 1 μm to 20 μm, or may have a D50 from 1 μm to 10 μm, for example. The active material particles may have a BET specific surface area from 1 m²/g to 10 m²/g, or may have a BET specific surface area from 3 m²/g to 5 m²/g, for example. The BET specific surface area is measured by a BET multi-point method.

When the active material particle includes a positive electrode active material, a positive electrode is produced. The positive electrode active material may include an optional component. The positive electrode active material may include, for example, at least one selected from the group consisting of $LiCoO_2$, $LiNiO_2$, $LiMnO_2$, $LiMn_2O_4$, $Li(NiCoMn)O_2$, $Li(NiCoAl)O_2$, and $LiFePO_4$. Here, the expression "(NiCoMn)" in the composition formula "Li(NiCoMn)$O_2$", for example, means that the constituents within the parentheses are collectively regarded as a single unit in the entire composition ratio. The active material particle may consist essentially of the positive electrode active material. The active material particle may further include a component other than the positive electrode active material. For example, to a surface of the active material particle, an oxide, a carbide, a boride, a phosphide, a halide, and/or the like may be adhered.

When the active material particle includes a negative electrode active material, a negative electrode is produced. The negative electrode active material may include an optional component. The negative electrode active material may include, for example, at least one selected from the group consisting of graphite, soft carbon, hard carbon, Si, SiO, Si-based alloy, Sn, SnO, Sn-based alloy, and $Li_4Ti_5O_{12}$. The active material particle may consist essentially of the negative electrode active material. The active material particle may further include a component other than the negative electrode active material.

(Binder)

The binder binds the active material particles to each other. The binder binds the active material particles and a substrate (described below) to each other. The binder may include an optional component. The binder may include, for example, at least one selected from the group consisting of polyvinylidene difluoride (PVdF), poly(vinylidenefluoride-co-hexafluoropropylene) (PVdF-HFP), polytetrafluoroethylene (PTFE), polyacrylic acid (PAA), carboxymethylcellulose (CMC), polyethylene oxide (PEO), and styrene-butadiene rubber (SBR). The amount of the binder may be, for example, from 0.1 parts by mass to 10 parts by mass relative to 100 parts by mass of the active material particles.

(Conductive Material)

To the slurry, a conductive material may be mixed. The conductive material forms electron conduction paths in the active material layer. The conductive material may include an optional component. The conductive material may include, for example, at least one selected from the group consisting of carbon black, carbon fiber, carbon nanotube (CNT), graphene flake, metal particle, and metal fiber. The amount of the conductive material may be, for example, from 0.1 parts by mass to 10 parts by mass relative to 100 parts by mass of the active material particles.

(Organic Solvent)

The organic solvent functions as a dispersion medium for the slurry. Part of the components (such as the binder, for example) may be dissolved in the organic solvent. The organic solvent may include, for example, at least one selected from the group consisting of N-methyl-2-pyrrolidone (NMP), tetrahydrofuran (THF), dimethylformamide (DMF), methyl ethyl ketone (MEK), and dimethyl sulfoxide (DMSO). The amount of the organic solvent is not particularly limited. In other words, the solid matter concentration (the mass fraction of solid matter) of the slurry is not particularly limited. The slurry may have a solid matter concentration from 40% to 80%, for example.

<<(B1) Applying>>

The first production method includes applying the slurry to a surface of a substrate to form a coating film. In the present embodiment, any applicator may be used to apply the slurry to a surface of the substrate. For example, a slot die coater, a roll coater, and/or the like may be used. The applicator may be an apparatus capable of multilayer application.

The substrate is a conductive sheet. For example, the substrate may include an aluminum (Al) foil, a copper (Cu) foil, and/or the like. For example, the substrate may have a thickness from 5 μm to 50 μm. For example, a covering layer may be formed on a surface of the substrate. The covering layer may include a conductive carbon material and/or the like, for example. The covering layer may have a thickness smaller than that of the active material layer, for example.

Figure 3:
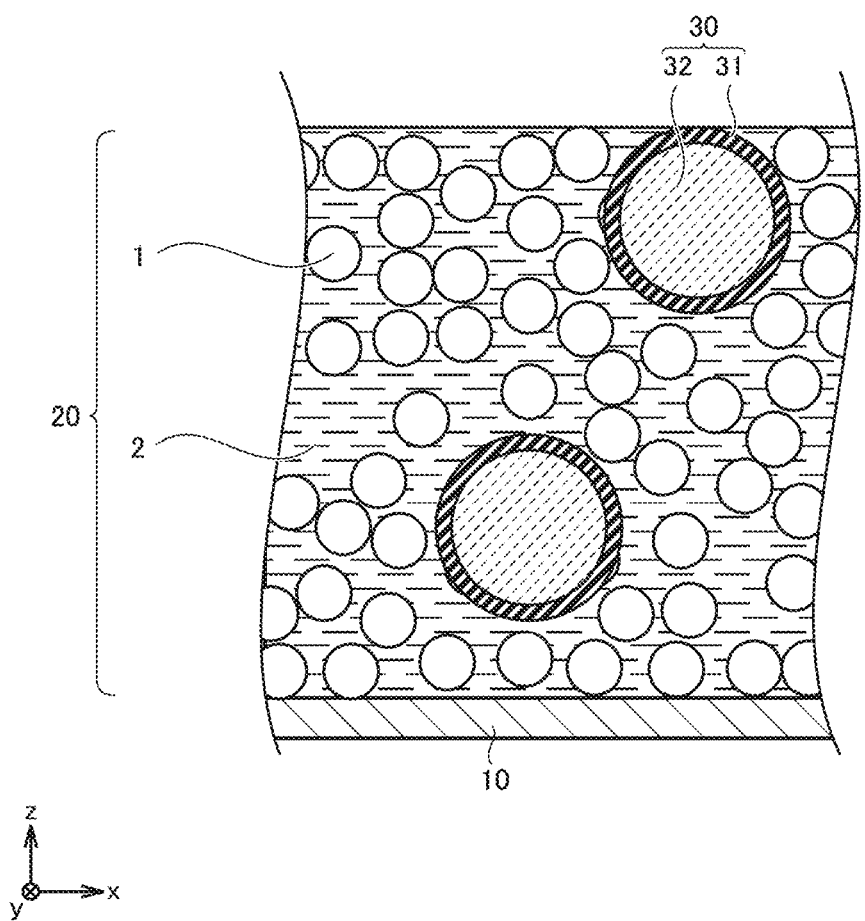
FIG. 3 is a first conceptual view illustrating an applying procedure according to the present embodiment.

FIG. 3 is a first conceptual view illustrating an applying procedure according to the present embodiment.

The slurry is applied to a surface of a substrate 10 to form a coating film 20. Coating film 20 includes active material particles 1, capsule-shaped particles 30, a binder (not illustrated), and an organic solvent 2. Coating film 20 may further include a conductive material (not illustrated). The thickness of coating film 20 may be adjusted, as appropriate, according to the desired thickness of the active material layer. The coating film may be formed by multilayer application, for example. The coating film may be formed by double-layer application, for example. By double-layer application, a lower layer (the substrate-side layer) and an upper layer (the surface-side layer) may be formed sequentially, or may be formed substantially at the same time.

Figure 4:
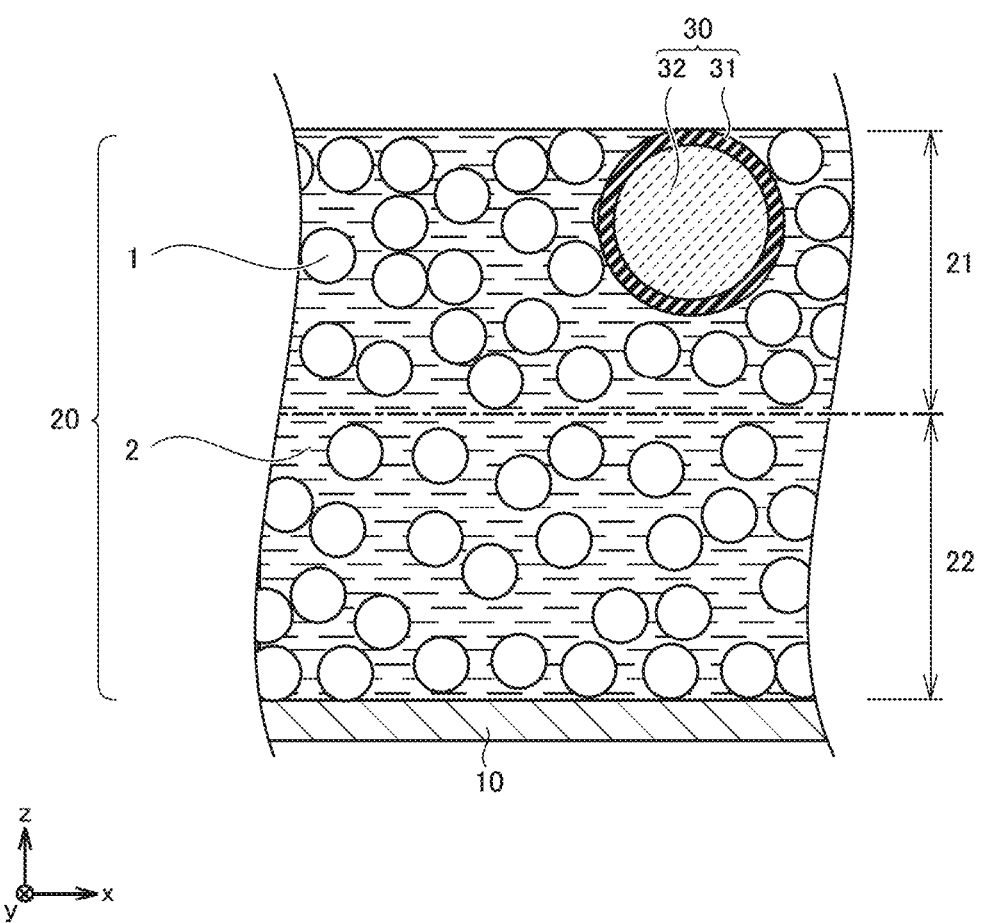
FIG. 4 is a second conceptual view illustrating an applying procedure according to the present embodiment.

FIG. 4 is a second conceptual view illustrating an applying procedure according to the present embodiment.

By double-layer application, an upper layer 21 may be formed in such a way that it contains more capsule-shaped particles than in a lower layer 22. Lower layer 22 may be formed in such a way that it contains substantially no capsule-shaped particles 30. By such double-layer application, it is possible to localize voids in the upper layer of the active material layer. When voids are localized in the upper layer, charge properties (lithium-accepting ability) may be enhanced, for example. Further, the amount of the capsule-shaped particles may be decreased. When the amount of the capsule-shaped particles is decreased, the capacity may be enhanced.

<<(C1) Drying>>

The first production method includes drying the coating film by heating to form an active material layer. In the present embodiment, any drying apparatus may be used as long as it is capable of heating the coating film. For example, a hot-air dryer and/or the like may be used to heat the coating film.

Figure 5:
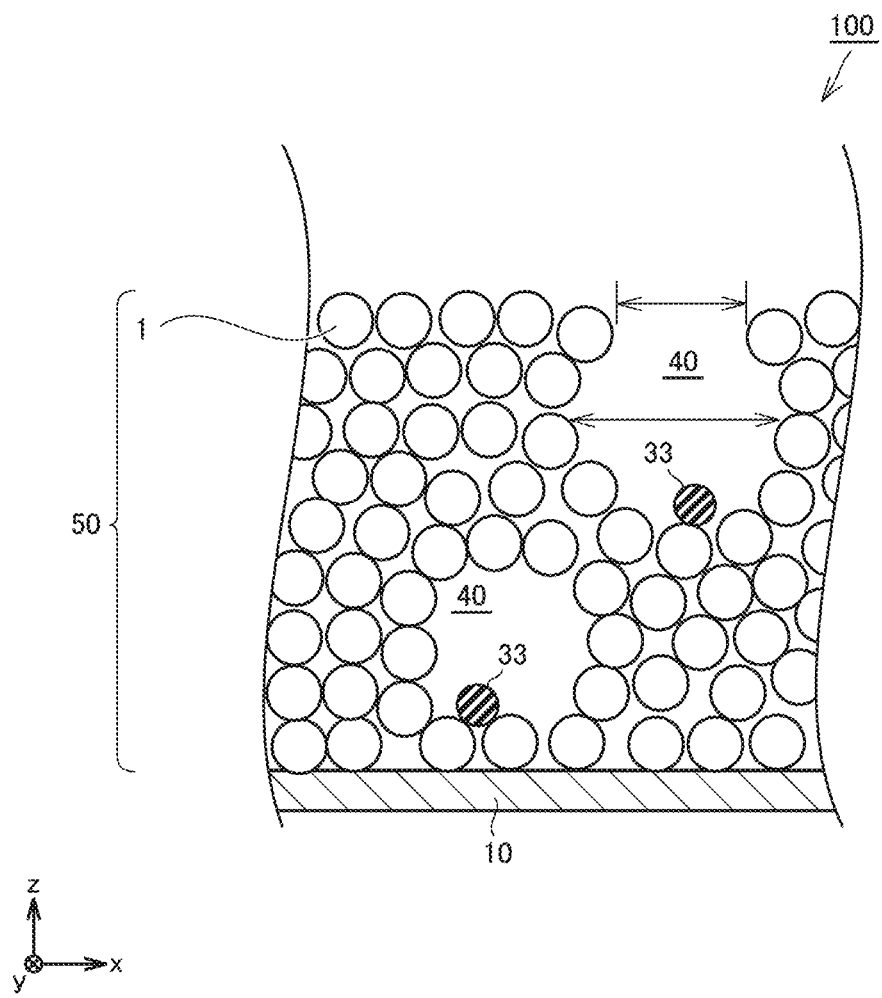
FIG. 5 is a conceptual view illustrating drying in the first production method.

FIG. 5 is a conceptual view illustrating drying in the first production method.

When coating film 20 is heated, capsule-shaped particles 30 (see FIG. 3) are heated in the presence of organic solvent 2. The thermoplastic resin (outer shell 31) softens, and capsule-shaped particles 30 shrink. As a result, voids 40 are formed. Inside voids 40, a resin fragment 33 remains. Resin fragment 33 is a deformed outer shell 31 (see FIG. 3). The "heating (or heated)" according to the present embodiment refers to application of heat. The temperature of the heated object does not necessarily increase. The heating temperature according to the present embodiment refers to the temperature inside the vessel of the dryer. The heating temperature (the drying temperature) is not particularly limited as long as it can cause the thermoplastic resin to soften. The heating temperature may be from 60° C. to 200° C., or may be from 80° C. to 150° C., or may be from 100° C. to 120° C., for example.

Further, when coating film 20 is heated, organic solvent 2 (see FIG. 3) may evaporate. Thus, organic solvent 2 may be substantially removed. Thus, an active material layer 50 is formed. In addition, when coating film 20 is heated, enclosed content 32 of capsule-shaped particles 30 may also evaporate. Thus, enclosed content 32 may also be substantially removed.

<<(D1) Compressing>>

The first production method includes compressing the active material layer to produce an electrode. In the present embodiment, any compressing apparatus may be used. For example, a rolling mill and/or the like may be used. The active material layer after drying is compressed, and thereby an electrode is completed. The electrode may be cut into a predetermined planar size, according to the specifications of the battery. The electrode may be cut into a belt-like planar shape, for example. The electrode may be cut into a rectangular planar shape, for example.

Compression may cause a change to the shape of the voids to some extent. However, the voids according to the present embodiment may maintain the predetermined shape and size after compression.

<Second Production Method (Method of Producing Battery)>

Figure 6:
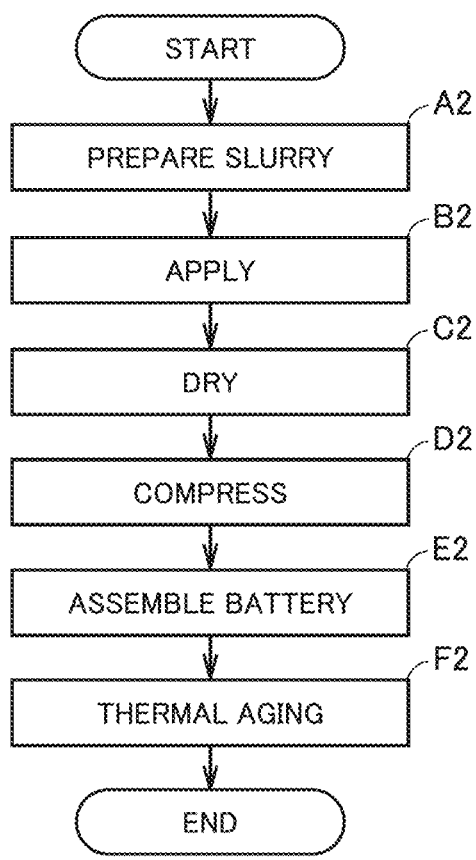
FIG. 6 is a schematic flowchart illustrating a second production method.

FIG. 6 is a schematic flowchart illustrating a second production method.

A second production method according to the present embodiment is a method of producing a battery. The second production method includes "(A2) Preparing a slurry", "(B2) Applying", "(C2) Drying", "(D2) Compressing", "(E2) Assembling a battery", and "(F2) Thermal aging". In the second production method, voids may be formed in the battery after the electrode is produced. The second production method may further include, for example, "Initial charging", "Initial discharging", and the like between "(E2) Assembling a battery" and "(F2) Thermal aging".

<<(A2) Preparing Slurry>>

The second production method includes preparing a slurry by mixing active material particles, capsule-shaped particles, a binder, and an aqueous solvent. In the second production method, an aqueous solvent is used as a dispersion medium for the slurry. In "(A2) Preparing a slurry" in the second production method, except for using an aqueous solvent, the same operation as in "(A1) Preparing a slurry" in the first production method may be carried out.

(Aqueous Solvent)

The aqueous solvent includes water (such as ion-exchanged water, for example). The aqueous solvent may consist essentially of water. In addition to water, the aqueous solvent may further include a polar organic solvent miscible with water. The aqueous solvent may further include an alcohol, a ketone, and/or the like, for example.

<<(B2) Applying>>

The second production method includes applying the slurry to a surface of a substrate to form a coating film. In "(A2) Applying" in the second production method, the same operation as in "(A1) Applying" in the first production method may be carried out.

<<(C2) Drying>>

The second production method includes drying the coating film by heating to form an active material layer. Also in the second production method, any drying apparatus may be used.

The aqueous solvent may evaporate at a relatively low heating temperature. The heating temperature may be from 40° C. to 200° C., or may be from 40° C. to 100° C., or may be from 50° C. to 90° C., or may be from 60° C. to 80° C., for example.

A thermoplastic resin contained in the capsule-shaped particles may be unlikely to soften upon contact with the aqueous solvent. In addition, the heating temperature may be set low. Therefore, in the second production method, in the active material layer after drying, the capsule-shaped particles may remain without shrinking. When the heating temperature for drying does not reach the temperature at which the capsule-shaped particles start expanding, the capsule-shaped particles may be heated and expanded before "(A2) Preparing a slurry".

<<(D2) Compressing>>

The second production method includes compressing the active material layer to produce an electrode. In "(D2) Compressing" in the second production method, the same operation as in "(D1) Compressing" in the first production method may be carried out. The active material layer after drying is compressed, and thereby an electrode is completed. In the active material layer after compression, the capsule-shaped particles may remain without substantially shrinking. The electrode may be cut into a predetermined planar size, according to the specifications of the battery.

<<(E2) Assembling Battery>>

The second production method includes assembling a battery that includes the electrode and an electrolyte solution.

Figure 7:
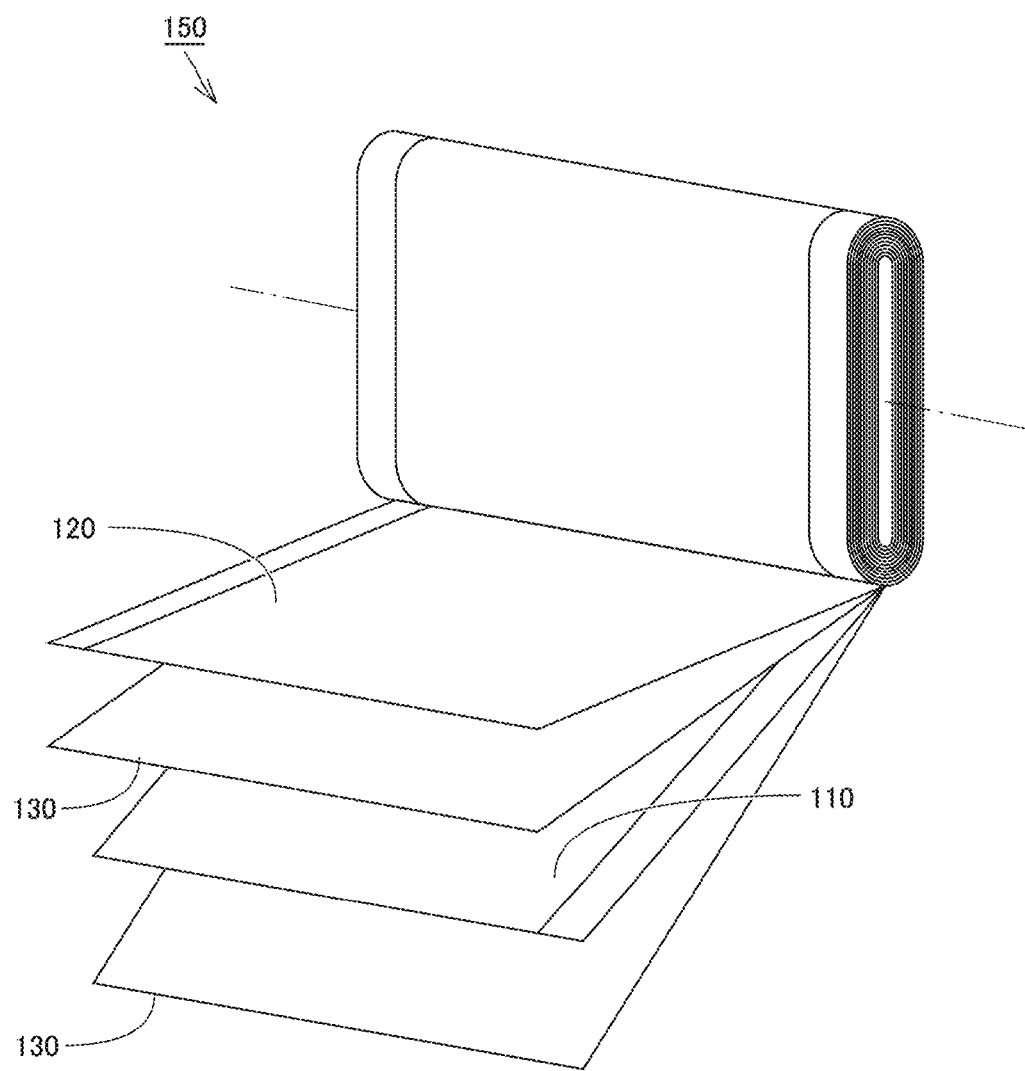
FIG. 7 is a schematic view illustrating an example of an electrode assembly according to the present embodiment.

FIG. 7 is a schematic view illustrating an example of an electrode assembly according to the present embodiment.

For example, an electrode assembly 150 is formed. Electrode assembly 150 is a wound-type one. However, a wound-type one is merely an example. The electrode assembly according to the present embodiment may be a stack-type one. Electrode assembly 150 includes a positive electrode 110, a separator 130, and a negative electrode 120. Each of positive electrode 110, separator 130, and negative electrode 120 is a belt-shaped sheet. Positive electrode 110, separator 130, and negative electrode 120 may be stacked and then wound spirally to form electrode assembly 150. Two separators 130 may be used. After the winding, electrode assembly 150 may be formed into a flat shape.

In the second production method, at least one of positive electrode 110 and negative electrode 120 is produced by the processes of "(A2) Preparing a slurry" to "(D2) Compressing".

Figure 8:
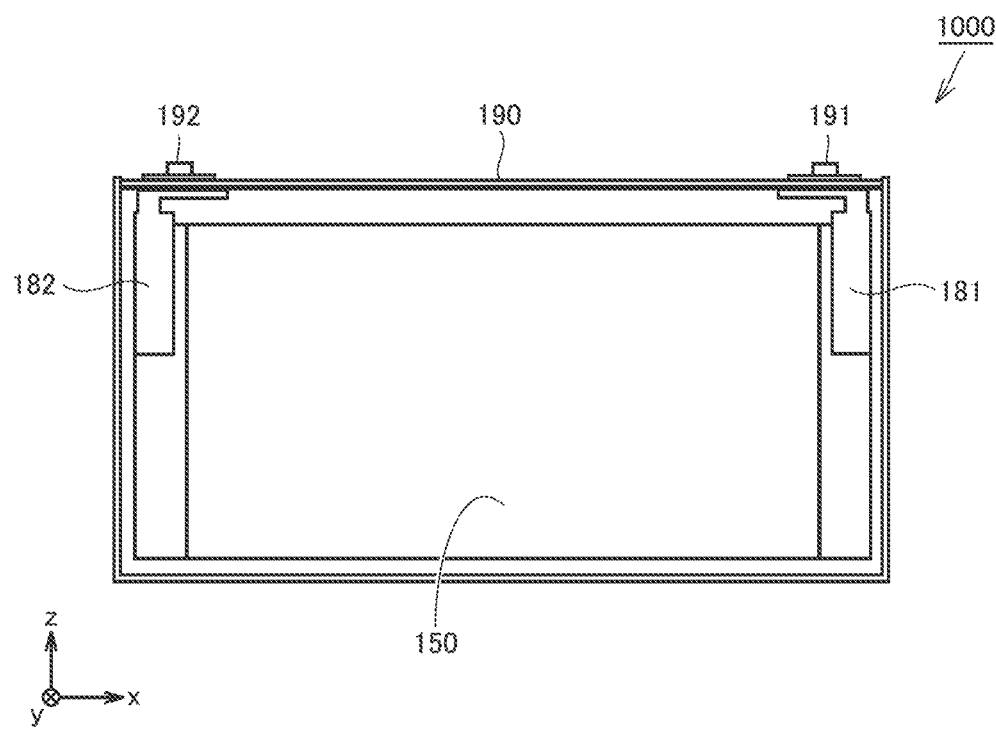
FIG. 8 is a schematic view illustrating an example of a battery according to the present embodiment.

FIG. 8 is a schematic view illustrating an example of a battery according to the present embodiment.

A housing 190 is prepared. Housing 190 may have any configuration. Housing 190 may be, for example, a metal container and/or the like. Housing 190 may be, for example, a pouch made of an aluminum-laminated film. Housing 190 may be, for example, prismatic or cylindrical. Housing 190 may have, for example, an inlet (not illustrated) through which an electrolyte solution is to be injected.

In housing 190, electrode assembly 150 is placed. For example, electrode assembly 150 may be connected to a positive electrode terminal 191 via a positive electrode current-collecting member 181. For example, electrode assembly 150 may be connected to a negative electrode terminal 192 via a negative electrode current-collecting member 182.

An electrolyte solution (not illustrated) is prepared. The electrolyte solution includes a supporting electrolyte and an organic solvent. Into housing 190, the electrolyte solution is injected. Electrode assembly 150 is impregnated with the electrolyte solution. After the electrolyte solution is injected, housing 190 is hermetically sealed. Thus, a battery 1000 is assembled. After battery 1000 is assembled, initial charging, initial discharging, and/or the like may be carried out, for example.

<<(F2) Thermal Aging>>

The second production method includes performing thermal aging of the battery. By the thermal aging of the battery, the battery is completed. The "thermal aging" according to the present embodiment refers to heating the battery for a predetermined length of time. For example, the SOC (State Of Charge) of the battery is adjusted. In the present embodiment, the state in which a capacity corresponding to the rated capacity has been charged is defined as an SOC of 100%. The SOC may be adjusted to a value from 40% to 80%, for example.

After the SOC adjustment, the battery is stored in a thermostatic chamber for a predetermined length of time, for example. The temperature inside the vessel of the thermostatic chamber may be from 40° C. to 120° C., or may be from 60° C. to 90° C., or may be from 70° C. to 80° C., for example. The storage duration may be from 1 hour to 48 hours, or may be from 12 hours to 24 hours, for example.

In the second production method, the thermoplastic resin contained in the capsule-shaped particles softens upon contact with the electrolyte solution. When the thermoplastic resin softens, the capsule-shaped particles may shrink to form voids in the active material layer.

The thermoplastic resin in the second production method may be, for example, a material that softens only by contact with the electrolyte solution (the organic solvent). The thermoplastic resin in the second production method may be, for example, a material that softens when heated in the presence of the electrolyte solution (the organic solvent). Therefore, the thermoplastic resin may soften during the time between the electrolyte solution injection and the thermal aging, for example. The thermoplastic resin may soften at the time of the thermal aging. In other words, voids may be formed during the time between the electrolyte solution injection and the thermal aging, or voids may be formed at the time of the thermal aging.

<Electrode>

An electrode 100 according to the present embodiment (see FIG. 5) may be produced by the first production method. Electrode 100 may be formed in the second production method. Electrode 100 includes substrate 10 and active material layer 50. The details of substrate 10 are as described above. Active material layer 50 may have a thickness from 10 μm to 200 μm, or may have a thickness from 50 μm to 100 μm, for example.

Active material layer 50 may have a density from 0.5 g/cm$^3$ to 5 g/cm$^3$, for example. When electrode 100 is a positive electrode, active material layer 50 may have a density from 2 g/cm$^3$ to 4 g/cm$^3$ or may have a density from 2 g/cm$^3$ to 3 g/cm$^3$, for example. When electrode 100 is a negative electrode, active material layer 50 may have a density from 0.8 g/cm$^3$ to 1.6 g/cm$^3$ or may have a density from 0.8 g/cm$^3$ to 1.2 g/cm$^3$, for example. The density of the active material layer refers to the apparent density thereof.

Active material layer 50 may have a porosity from 40% to 80%, for example. The porosity refers to the total porosity, taking into account all the pores including the gaps between active material particles 1 as well as voids 40. The porosity may be measured by mercury porosimetry. Active material layer 50 may have a porosity from 50% to 70%, for example. The fraction of the total porosity that is attributed to voids 40 may be 10% or more, for example. The fraction of the total porosity that is attributed to voids 40 may be from 10% to 90%, or may be from 10% to 50%, or may be from 50% to 90%, for example.

Active material layer 50 includes active material particles 1, resin fragment 33, and a binder (not illustrated). Active material layer 50 may further include a conductive material (not illustrated) and/or the like, for example. The details of active material particles 1, the binder, and the conductive material are as described above. In the present embodiment, voids 40 are formed in active material layer 50. Resin fragment 33 is placed inside voids 40. Resin fragment 33 includes a thermoplastic resin. Resin fragment 33 may be a deformed outer shell 31 of capsule-shaped particle 30 (see FIG. 2, FIG. 5). Resin fragment 33 may have any shape. Resin fragment 33 may be flakes or may be particles, for example. Resin fragment 33 placed inside voids 40 is not likely to substantially inhibit electronic conduction or ionic conduction inside active material layer 50. In another embodiment according to the present disclosure, at least part of resin fragment 33 may be removed from voids 40 by an appropriate method (such as sucking and/or air blowing, for example).

Each void 40 has a diameter larger than the particle size of active material particles 1. The "particle size" and the "diameter" here refer to the maximum diameter in a cross-sectional SEM image. The maximum diameter of active material particle 1 refers to a distance between two points located farthest apart from each other on an outline of the active material particle 1. As for ten or more active material particles 1, the maximum diameters are measured. The ten or more active material particles 1 are randomly selected. The arithmetic mean of the ten or more maximum diameters is used as the particle size of active material particles 1. Active material particles 1 may have a particle size from 1 μm to 30 μm, or may have a particle size from 1 μm to 10 μm, or may have a particle size from 1 μm to 5 μm, for example.

The maximum diameter of void 40 refers to a distance between two points located farthest apart from each other on an outline of the void 40. As for ten or more voids 40, the maximum diameters are measured. The ten or more voids 40 are randomly selected. The arithmetic mean of the ten or more maximum diameters is used as the diameter of voids 40. Voids 40 may have a diameter from 5 μm to 100 μm, or may have a diameter from 10 μm to 50 μm, or may have a diameter from 15 μm to 30 μm, for example.

Voids 40 according to the present embodiment may have a shape attributed to capsule-shaped particles 30. The voids may have a shape that is closely analogous to spherical, for example. Voids 40 may have an aspect ratio from 1 to 5, for example. Voids 40 may have an aspect ratio from 1 to 3, for example. Voids 40 may have an aspect ratio from 1 to 2, for example. Voids 40 may have an aspect ratio from 1 to 1.5, for example. The "aspect ratio" refers to the ratio of the longer diameter to the shorter diameter. The aspect ratio is measured in a cross-sectional SEM image. The maximum diameter in a cross-sectional SEM image as described above is regarded as the longer diameter. Among all the diameters perpendicular to the line defining the longer diameter, the longest one is regarded as the shorter diameter. The aspect ratio is measured for ten or more voids 40. The ten or more voids 40 are randomly selected. The arithmetic mean of the ten or more aspect ratio values is used as the aspect ratio of voids 40.

At least some of voids 40 may have openings (mouths) in a surface of active material layer 50. Each of the openings may have a width smaller than the internal width of the void 40. Each of the internal width and the opening width is a dimension perpendicular to the thickness direction of active material layer 50 (the x-axis direction in FIG. 5). When void 40 has an opening in a surface of active material layer 50, enhanced accepting ability and the like may be obtained, for example.

In active material layer 50 according to the present embodiment, at least one void 40 is formed. Voids 40 may have a number density from 50 voids/mm$^2$ to 10000 voids/mm$^2$, for example. When the number density of voids 40 is from 50 voids/mm$^2$ to 10000 voids/mm$^2$, a good balance between battery resistance and capacity tends to be obtained. The number density is measured in a surface SEM image of electrode 100 (active material layer 50). The surface SEM image is an SEM image captured in the z-axis direction of FIG. 5. At ten positions that are randomly selected on a surface of electrode 100, surface SEM images are captured. In other words, ten or more SEM images are prepared. In each SEM image, voids 40 are counted. The number of voids 40 is divided by the area of the view to calculate the number density. In each of the ten or more SEM images, the number density is calculated. The arithmetic mean of the ten or more values of number density is used as the number density of voids 40. Voids 40 may have a number density from 100 voids/mm$^2$ to 500 voids/mm$^2$, for example.

<Battery>

Battery 1000 according to the present embodiment (see FIG. 8) may be used for any application. For example, battery 1000 may be used as a main electric power supply or a motive force assisting electric power supply in an electric vehicle. A plurality of batteries 1000 (cells) may be connected together to form a battery module or a battery pack.

The battery includes an electrode and an electrolyte solution. The structure of the battery is not particularly limited. An example of the structure is as described above. The battery may further include a housing, a separator, and the like, in addition to the electrode and the electrolyte solution.

<<Electrode>>

The electrode is at least one of a positive electrode and a negative electrode. The electrode is produced by the first production method, or formed in the second production method. The details of the electrode are as described above. In the present embodiment, voids are formed in the electrode. As a result, battery resistance may be decreased. Voids may be formed in one of the positive electrode and the negative electrode. Voids may be formed in both the positive electrode and the negative electrode.

<<Electrolyte Solution>>

The electrolyte solution includes a supporting electrolyte and an organic solvent. The electrolyte solution may further include an optional additive, in addition to the supporting electrolyte and the organic solvent. The organic solvent is aprotic. The organic solvent may include at least one selected from the group consisting of ethylene carbonate (EC), propylene carbonate (PC), ethyl methyl carbonate (EMC), dimethyl carbonate (DMC), and diethyl carbonate (DEC), for example. The supporting electrolyte is dissolved in the organic solvent. The supporting electrolyte may include an optional component. The supporting electrolyte may include, for example, at least one selected from the group consisting of $LiPF_6$, $LiBF_4$, and $LiN(FSO_2)_2$. The supporting electrolyte may have a concentration from 0.5 mol/L to 2.0 mol/L, for example.

<<Separator>>

The battery may further include a separator (see reference numeral 130 in FIG. 7). At least part of the separator is interposed between the positive electrode and the negative electrode. The separator separates the positive electrode from the negative electrode. The separator may have a thickness from 10 μm to 30 μm, for example. The separator is porous. The separator is electrically insulating. The separator may be made of polyolefin, for example. The separator may have a monolayer structure, for example. The separator may consist of a polyethylene (PE) layer, for example. The separator may have a multilayer structure, for example. The separator may have a three-layer structure, for example. The separator may include a polypropylene (PP) layer, a PE layer, and a PP layer, for example. The PP layer, the PE layer, and the PP layer may be stacked in this order. On a surface of the separator, a ceramic layer and/or the like may be formed, for example.

EXAMPLES

Next, examples according to the present disclosure (hereinafter also called "the present example") will be described. It should be noted that the below description does not limit the scope of claims.

<Production of Positive Electrode>

<<(A1) Preparing Slurry>>

The below materials were prepared.
Active material particles: $LiNi_{1/3}Co_{1/3}Mn_{1/3}O_2$
Conductive material: conductive carbon
Binder: PVdF
Capsule-shaped particles: thermally expandable microcapsules (before expanded)
Organic solvent: NMP
Substrate: Al foil The active material particles, the capsule-shaped particles, the binder, the conductive material, and the organic solvent were mixed to prepare a slurry. The mass ratio of the other solid matter was "(active material particles)/(conductive material)/binder=97/2/1". The capsule-shaped particles were mixed so that they had a mass fraction of 0.5% relative to the other solid matter.

<<(B1) Applying>>

The slurry was applied to the surface (both sides) of the substrate to form a coating film. The coating film was formed in such a manner that a part of the substrate was exposed from it.

<<(C1) Drying>>

The coating film was heated and dried with a batch-type dryer to form an active material layer. The heating temperature was 120° C. The active material layer had a coating weight of 50 g/m² per side, a density of 1.45 g/cm³, and a porosity of 66%.

Figure 9:
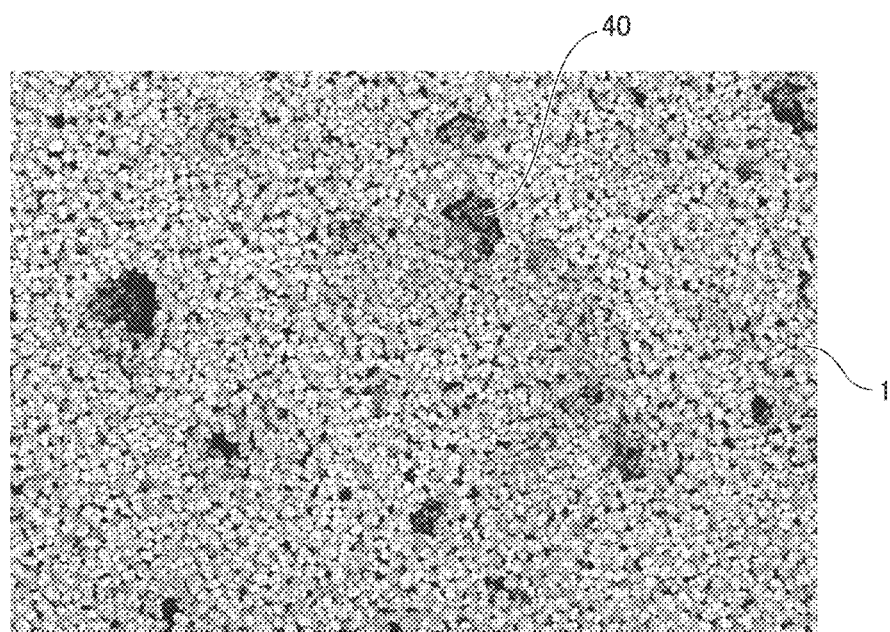
FIG. 9 is a surface SEM image of a positive electrode after drying according to the present example.

FIG. 9 is a surface SEM image of a positive electrode after drying according to the present example.

Many voids 40 were formed in the active material layer. It is considered that the formation of voids 40 was caused by shrinkage of the capsule-shaped particles.

<<(D1) Compressing>>

The active material layer was compressed to produce a positive electrode raw sheet. The density of the active material layer after compression was 2.1 g/cm³.

Figure 10:
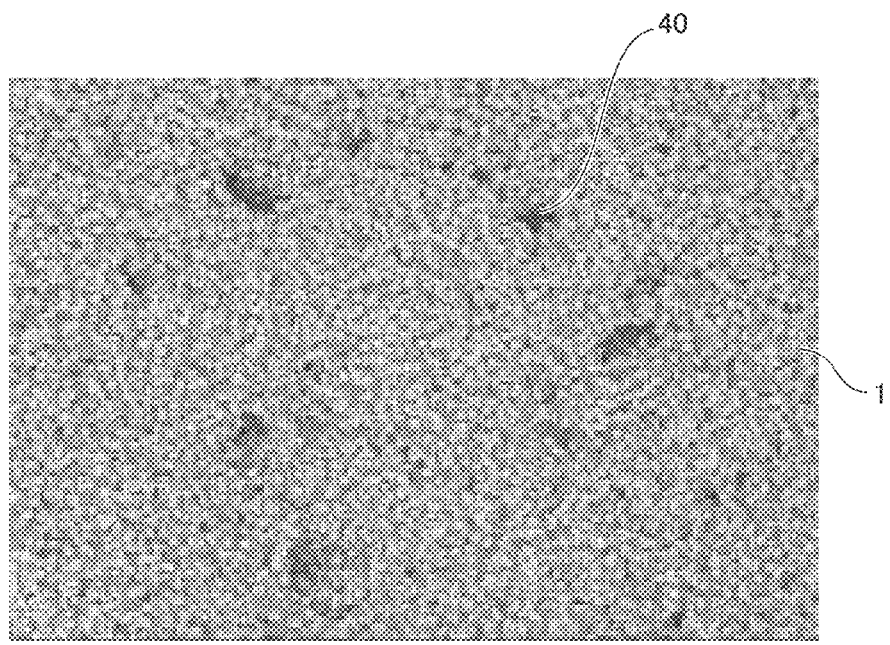
FIG. 10 is a surface SEM image of a positive electrode after compression according to the present example.

FIG. 10 is a surface SEM image of a positive electrode after compression according to the present example.

Voids 40 that were formed at the time of drying remained after compression. Voids 40 had a diameter larger than the particle size of active material particles 1.

<Production of Negative Electrode>

<<(A2) Preparing Slurry>>

The below materials were prepared.
Active material particles: graphite (D50=10 μm, BET specific surface area=4.5 m²/g)
Binder: CMC, SBR
Capsule-shaped particles: thermally expandable microcapsules (after expanded)
Aqueous solvent: water
Substrate: Cu foil In advance, the capsule-shaped particles were heated and thereby expanded. The active material particles, the capsule-shaped particles, the binder, and the aqueous solvent were mixed to prepare a slurry. The mass ratio of the other solid matter was "(active material particles)/CMC/SBR=99/0.6/0.4". The capsule-shaped particles were mixed so that they had a mass fraction of 0.7% relative to the other solid matter.

<<(B2) Applying>>

The slurry was applied to the surface (both sides) of the substrate to form a coating film. The coating film was formed in such a manner that a part of the substrate was exposed from it.

<<(C2) Drying>>

The coating film was heated and dried with a batch-type dryer to form an active material layer. The heating temperature was 60° C. The active material layer had a coating weight of 34.5 g/m² per side.

Figure 11:
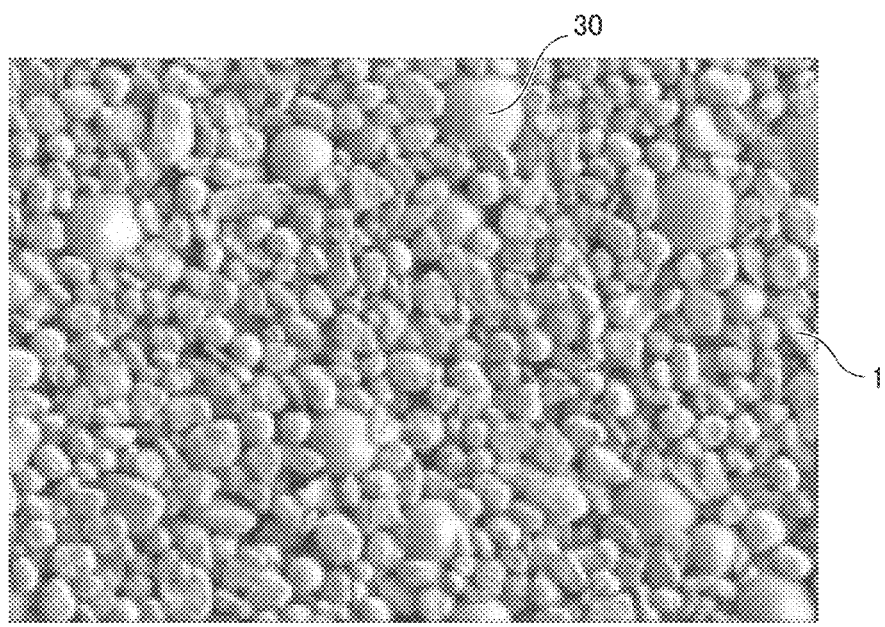
FIG. 11 is a surface SEM image of a negative electrode after drying according to the present example.

FIG. 11 is a surface SEM image of a negative electrode after drying according to the present example.

On a surface of the active material layer, capsule-shaped particles 30 were exposed. Capsule-shaped particles 30 were not yet shrunk, and no voids were formed.

<<(D2) Compressing>>

The active material layer was compressed to produce a negative electrode raw sheet. The active material layer after compression had a density of 0.8 g/cm³ and a porosity of 63%.

Figure 12:
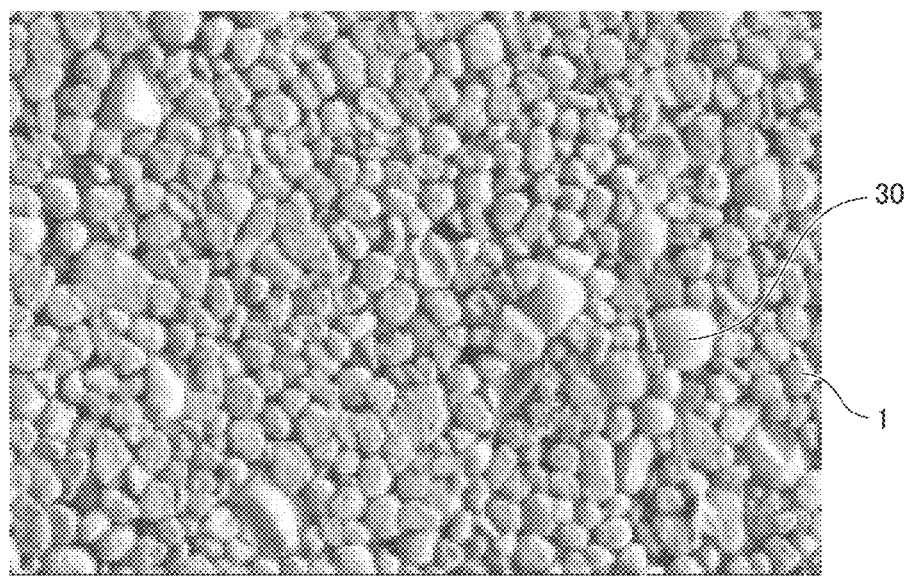
FIG. 12 is a surface SEM image of a negative electrode after compression according to the present example.

FIG. 12 is a surface SEM image of a negative electrode after compression according to the present example.

In the active material layer after compression, it was observed again that capsule-shaped particles 30 remained without substantially shrinking.

<Production of Test Battery>

<<(E2) Assembling Battery>>

Figure 13:
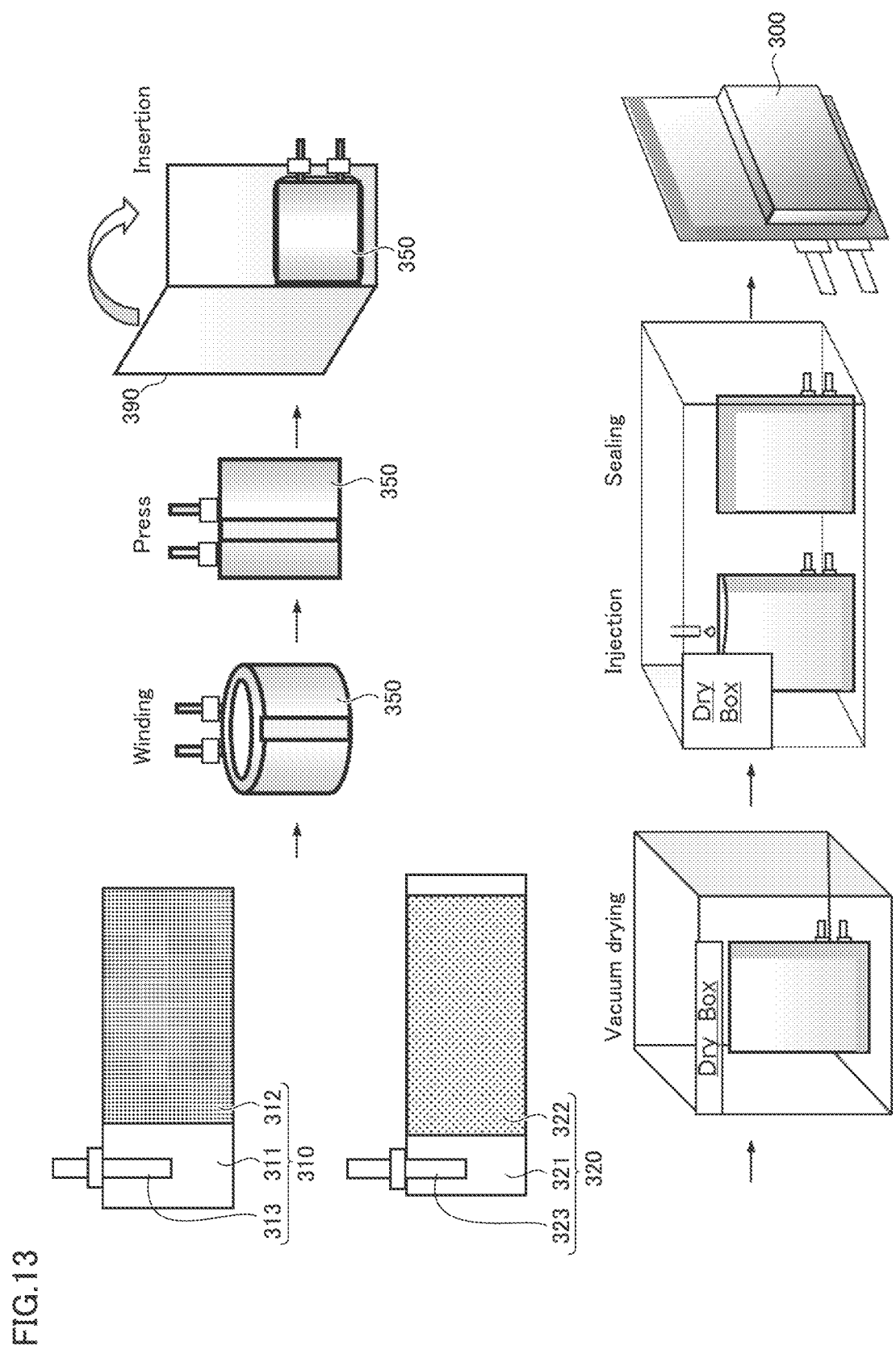
FIG. 13 is a schematic view illustrating a process of assembling a test battery according to the present example.

FIG. 13 is a schematic view illustrating a process of assembling a test battery according to the present example.

The positive electrode raw sheet produced in the above manner was cut to form a positive electrode 310. The planar shape of positive electrode 310 was a belt-like shape. Positive electrode 310 had planar dimensions of 50 mm in width and 230 mm in length. Positive electrode 310 included a positive electrode substrate 311 and a positive electrode active material layer 312. Part of positive electrode substrate 311 was exposed from positive electrode active material layer 312. To the exposed portion of positive electrode substrate 311, a positive electrode lead tab 313 was bonded by ultrasonic bonding. The position where positive electrode lead tab 313 was bonded was at a distance of 7 mm from one end in a longitudinal direction.

The negative electrode raw sheet produced in the above manner was cut to form a negative electrode 320. The planar shape of negative electrode 320 was a belt-like shape. Negative electrode 320 had planar dimensions of 52 mm in width and 330 mm in length. Negative electrode 320 included a negative electrode substrate 321 and a negative electrode active material layer 322. Part of negative electrode substrate 321 was exposed from negative electrode active material layer 322. To the exposed portion of negative electrode substrate 321, a negative electrode lead tab 323 was bonded by ultrasonic bonding. The position where negative electrode lead tab 323 was bonded was at a distance of 18 mm from one end in a longitudinal direction.

A separator (not illustrated) was prepared. The separator included a PP layer and a PE layer. Positive electrode 310, the separator, and negative electrode 320 were stacked in this order and then wound spirally to form an electrode assembly 350. Positive electrode lead tab 313 and negative electrode lead tab 323 were on the outer circumference of electrode assembly 350. After the winding, electrode assembly 350 was shaped into a flat form.

A housing 390 was prepared. Housing 390 was made of an aluminum-laminated film. Into housing 390, electrode assembly 350 was inserted. After insertion, the work (housing 390 and electrode assembly 350) was transferred into a dry box. The work was vacuum dried.

An electrolyte solution was prepared. The electrolyte solution included an organic solvent, which is described below, and a supporting electrolyte. The ratio of the components of the organic solvent is based on the volume at 25° C. and 1 atmospheric pressure.

Organic solvent: "EC/DMC/EMC=25/35/40 (volume ratio)"

Supporting electrolyte: $LiPF_6$ (concentration=1.15 mol/L)

After vacuum drying, the electrolyte solution was injected into housing 390. After the electrolyte solution was injected, housing 390 was hermetically sealed. In this way, a test battery 300 was assembled. It was expected that, inside test battery 300, capsule-shaped particles (the thermoplastic resin) in negative electrode active material layer 322 came into contact with the electrolyte solution.

<<(F2) Thermal Aging>>

The SOC of the test battery was adjusted. In a thermostatic chamber set at 75° C., the test battery was stored for 16 hours.

Figure 14:
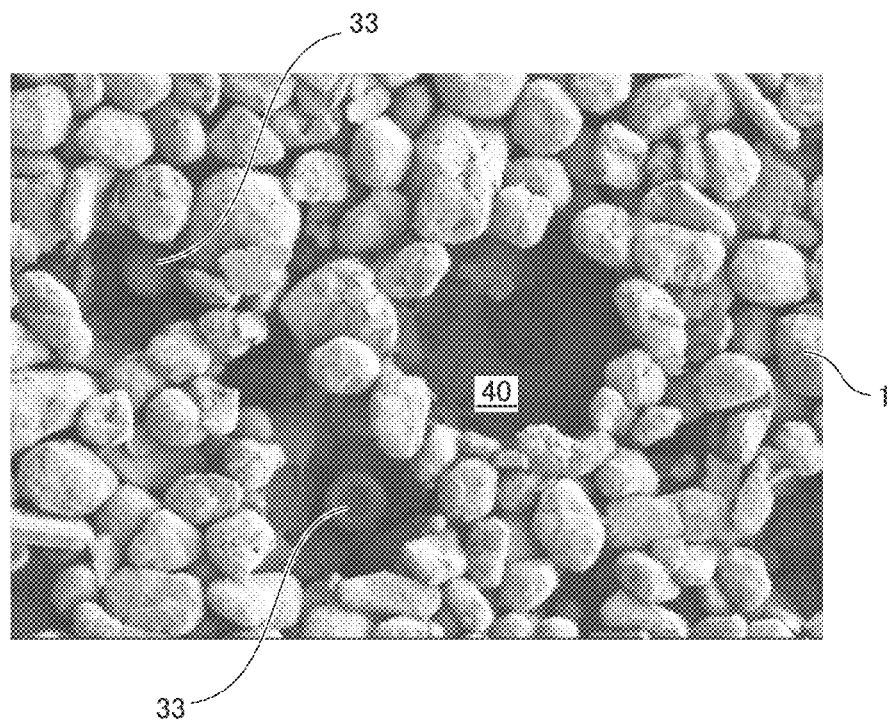
FIG. 14 is a surface SEM image of a negative electrode after thermal aging according to the present example.

FIG. 14 is a surface SEM image of a negative electrode after thermal aging according to the present example.

After thermal aging, the capsule-shaped particles shrank to form voids 40. Inside voids 40, resin fragment 33 remained. Resin fragment 33 may be a deformed (shrunk) outer shell of the capsule-shaped particle.

Figure 15:
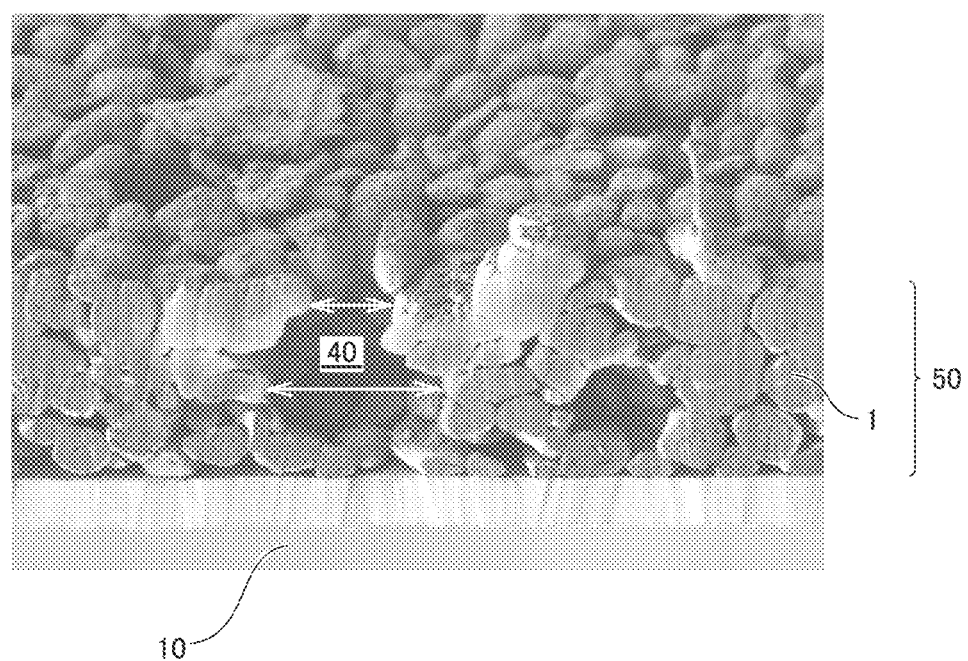
FIG. 15 is a cross-sectional SEM image of a negative electrode after thermal aging according to the present example.

FIG. 15 is a cross-sectional SEM image of a negative electrode after thermal aging according to the present example.

From FIG. 14 and FIG. 15, it is considered that voids 40 according to the present example had a shape that was closely analogous to spherical. Each void 40 had a diameter larger than the particle size of active material particles 1. Voids 40 had a diameter of 20 μm. Some of voids 40 had openings in a surface of active material layer 50. Each of the openings had a width smaller than the internal width of the void 40.

By the above-described procedure, in the present example, test batteries No. 1 to No. 3 were produced. As for No. 1, capsule-shaped particles were contained in the positive electrode, and capsule-shaped particles were not contained in the negative electrode. As for No. 2, capsule-shaped particles were contained in the negative electrode, and capsule-shaped particles were not contained in the positive electrode. As for No. 3, capsule-shaped particles were not contained in either the positive electrode or the negative electrode.

<Evaluation>

The SOC of each test battery was adjusted to 50%. In an environment at a temperature of 25° C., the test battery was charged and discharged in a constant-current mode. After a lapse of 10 seconds from the start of the charge and discharge, the voltage was measured. At various currents, the voltage after a lapse of 10 seconds from the start of the charge and discharge was measured. The relationship between the current and the voltage was plotted on two-dimensional rectangular coordinates, and thus an I-V plot was created. From the slope of the I-V plot, direct-current resistance was calculated.

After the initial direct-current resistance was measured, the SOC of the test battery was adjusted to 80%. After the SOC adjustment, the voltage of the test battery was 3.86 V. The test battery was placed in a thermostatic chamber that was set at 70° C. The test battery was stored in the thermostatic chamber for 53 days. After 53 days, the direct-current resistance was measured as in the same manner for the initial direct-current resistance.

TABLE 1

|  |  | No.1 | No.2 | No.3 |
|---|---|---|---|---|
| Positive electrode | Mass fraction of capsule-shaped particles [%] | 0.5 | 0 | 0 |
|  | Voids | Present | None | None |
|  | Before compression, Porosity [%] | 66 | 63 | 63 |
|  | Before compression, Density [g/cm$^3$] | 1.45 | 1.6 | 1.6 |
|  | After compression, Density [g/cm$^3$] | 2.1 | 2.1 | 2.1 |
| Negative electrode | Mass fraction of capsule-shaped particles [%] | 0 | 0.7 | 0 |
|  | Voids | None | Present | None |
|  | After compression, Porosity [%] | 54 | 63 | 54 |
|  | After compression, Density [g/cm$^3$] | 1.0 | 0.8 | 1.0 |
| Evaluation | Initial, Direct-current resistance [—][1] | 93 | 85 | 100 |
|  | After high-temperature storage, Direct-current resistance [—][1] | 106 | 98 | 113 |

[1] The value is a relative value. The initial direct-current resistance of No.3 is defined as 100.

Results

The positive electrode of No. 1 was produced by using a slurry that contained capsule-shaped particles. The positive electrode of No. 3 was produced by using a slurry that did not contain capsule-shaped particles. As for the positive electrode active material layer of No. 1, its porosity before compression was higher than that of No. 3. As for the positive electrode active material layer of No. 1, its density before compression was lower than that of No. 3. From the SEM image analysis, the surface area of the positive electrode active material layer of No. 1 was larger than that of the positive electrode active material layer of No. 3, by about 10%.

No. 1 had a lower direct-current resistance than that of No. 3. The resistance-lowering effect was preserved after high-temperature storage. As for No. 1, voids were formed in the positive electrode active material layer. It is considered that No. 1 had a greater reaction area than No. 3.

Figure 16:
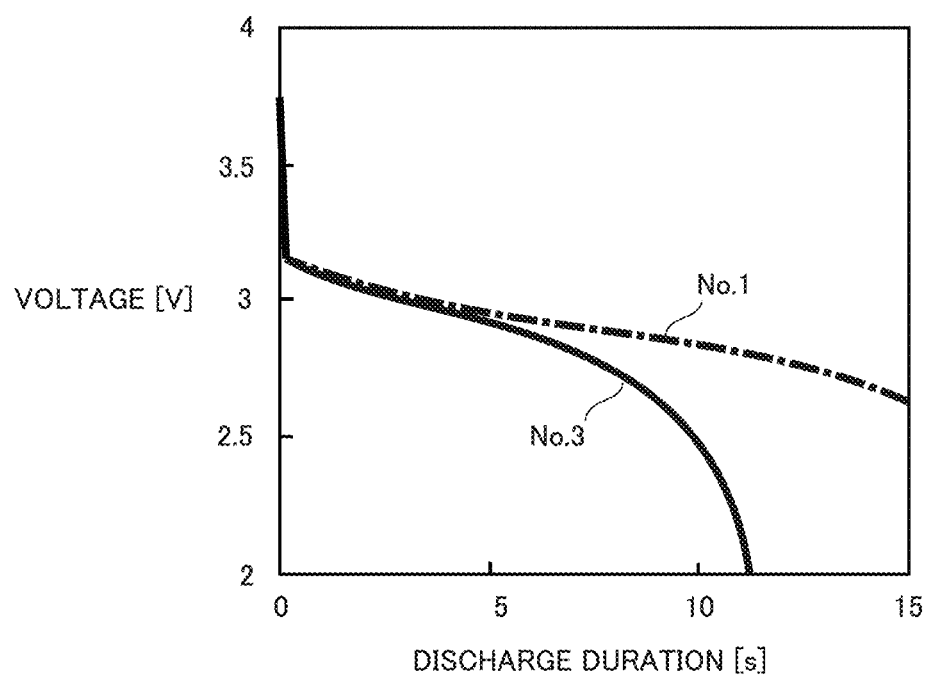
FIG. 16 is a graph of a discharge profile of No. 1 and No. 3 according to the present example.

FIG. 16 is a graph of a discharge profile of No. 1 and No. 3 according to the present example. A tendency is observed that the voltage drop of No. 1 in the end stage of discharge is smaller than No. 3.

The negative electrode of No. 2 was produced by using a slurry that contained capsule-shaped particles. The negative electrode of No. 3 was produced by using a slurry that did not contain capsule-shaped particles. As for the negative electrode active material layer of No. 2, its porosity after compression was higher than that of No. 3. As for the negative electrode active material layer of No. 2, its density after compression was lower than that of No. 3. From the SEM image analysis, the surface area of the negative electrode active material layer of No. 2 was larger than that of the negative electrode active material layer of No. 3, by about 50%.

No. 2 had a direct-current resistance that was lower than that of No. 3. The resistance-lowering effect was preserved after high-temperature storage. As for No. 2, voids were formed in the negative electrode active material layer. It is considered that No. 2 had a greater reaction area than No. 3.

Further, it was observed that the accepting ability of No. 2 at a low temperature (−6.7° C.) was higher than that of No. 3, by 20%.

The present embodiment and the present example are illustrative in any respect. The present embodiment and the present example are non-restrictive. For example, it is expected that certain configurations of the present embodiments and the present examples can be optionally combined.

The technical scope defined by the terms of the claims encompasses any modifications within the meaning equivalent to the terms of the claims. The technical scope defined by the terms of the claims also encompasses any modifications within the scope equivalent to the terms of the claims.

What is claimed is:

1. A method of producing an electrode, comprising:
preparing a slurry by mixing active material particles, capsule-shaped particles, a binder, and an organic solvent;
applying the slurry to a surface of a substrate to form a coating film;
drying the coating film by heating to form an active material layer; and
compressing the active material layer to produce an electrode, wherein
each of the capsule-shaped particles includes a thermoplastic resin, the thermoplastic resin softens when heated in the presence of the organic solvent,
when the thermoplastic resin softens, the capsule-shaped particles shrink to form voids in the active material layer,
the binder includes at least one selected from the group consisting of polyvinylidene difluoride, poly(vinylidenefluoride-cohexafluoropropylene), polytetrafluoroethylene, polyacrylic acid, carboxymethylcellulose, polyethylene oxide, and styrene-butadiene rubber,
the thermoplastic resin comprises at least one of an acrylic-based resin, an acrylonitrile-based resin, or a vinylidenechloride-based resin, and
when the coating film is dried, the thermoplastic resin is heated together with the organic solvent, and heating temperature is in the range of from 60 to 150 degrees Celsius.

2. The method of producing an electrode according to claim 1, wherein
each of the capsule-shaped particles includes an outer shell and an enclosed content,
the outer shell includes the thermoplastic resin, and
the enclosed content includes at least one selected from the group consisting of a volatile substance and a gas.

3. The method of producing an electrode according to claim 2, wherein
the enclosed content includes the volatile substance, and
the volatile substance has a volume fraction of 5% or more relative to the capsule-shaped particles.

4. The method of producing an electrode according to claim 2, wherein
the enclosed content includes the gas, and
the gas has a volume fraction of 50% or more relative to the capsule-shaped particles.

5. The method of producing an electrode according to claim 1, wherein a ratio of a D50 of the capsule-shaped particles to a thickness of the active material layer is from 0.2 to 0.8.

6. The method of producing an electrode according to claim 1, wherein each of the active material particles includes a positive electrode active material or a negative electrode active material.

7. A method of producing a battery, comprising:
preparing a slurry by mixing active material particles, capsule-shaped particles, a binder, and an aqueous solvent;
applying the slurry to a surface of a substrate to form a coating film;
drying the coating film by heating to form an active material layer;
compressing the active material layer to produce an electrode;
assembling a battery that includes the electrode and an electrolyte solution; and
performing thermal aging of the battery, wherein
the electrolyte solution includes an organic solvent,
each of the capsule-shaped particles includes a thermoplastic resin,
the thermoplastic resin softens upon contact with the electrolyte solution,
when the thermoplastic resin softens, the capsule-shaped particles shrink to form voids in the active material layer,
the binder includes at least one selected from the group consisting of polyvinylidene difluoride, poly(vinylidenefluoride-cohexafluoropropylene), polytetrafluoroethylene, polyacrylic acid, carboxymethylcellulose, polyethylene oxide, and styrene-butadiene rubber,
the thermoplastic resin comprises at least one of an acrylic-based resin, an acrylonitrile-based resin, or a vinylidenechloride-based resin, and
in the drying, heating temperature is in a range of from 40 to 100 degrees Celsius.

8. The method of producing a battery according to claim 7, wherein the voids are formed at the time of the thermal aging.

9. The method of producing a battery according to claim 7, wherein
each of the capsule-shaped particles includes an outer shell and an enclosed content,
the outer shell includes the thermoplastic resin, and
the enclosed content includes at least one selected from the group consisting of a volatile substance and a gas.

10. The method of producing a battery according to claim 9, wherein
the enclosed content includes the volatile substance, and
the volatile substance has a volume fraction of 5% or more relative to the capsule-shaped particles.

11. The method of producing a battery according to claim 9, wherein
the enclosed content includes the gas, and
the gas has a volume fraction of 50% or more relative to the capsule-shaped particles.

12. The method of producing a battery according to claim 7, wherein a ratio of a D50 of the capsule-shaped particles to a thickness of the active material layer is from 0.2 to 0.8.

13. The method of producing a battery according to claim 7, wherein each of the active material particles includes a positive electrode active material or a negative electrode active material.

14. An electrode comprising:
a substrate; and
an active material layer, wherein the active material layer is placed on a surface of the substrate, the active material layer includes active material particles, a resin fragment, and a binder, voids are formed in the active material layer, each of the voids has a diameter larger than a particle size of the active material particles, the resin fragment is placed inside the voids, the resin fragment includes a thermoplastic resin, the binder includes at least one selected from the group consisting of polyvinylidene difluoride, poly(vinylidenefluoride-cohexafluoropropylene), polytetrafluoroethylene, polyacrylic acid, carboxymethylcellulose, polyethylene oxide, and styrene-butadiene rubber, the thermoplastic resin comprises at least one of an acrylic-based resin, an acrylonitrile-based resin, or a vinylidenechloride-based resin, and the thermoplastic resin softens at a temperature in the range of from 60 to 150 degrees Celsius.

15. The electrode according to claim 14, wherein at least some of the voids have openings in a surface of the active material layer, and each of the openings has a width smaller than an internal width of the void.

16. The electrode according to claim 14, wherein the voids have a number density from 50 voids/mm$^2$ to 10000 voids/mm$^2$.

17. The electrode according to claim 14, wherein each of the active material particles includes a positive electrode active material or a negative electrode active material.

18. A battery comprising:

the electrode according to claim 14, and an electrolyte solution.

* * * * *